Nov. 19, 1968  A. STRICKLER  3,412,008

ELECTROPHORESIS APPARATUS

Filed Aug. 23, 1965  4 Sheets-Sheet 1

INVENTOR:
ALLEN STRICKLER
BY Louis Mok
ATTORNEY

INVENTOR:
ALLEN STRICKLER

United States Patent Office 3,412,008
Patented Nov. 19, 1968

3,412,008
ELECTROPHORESIS APPARATUS
Allen Strickler, Fullerton, Calif., assignor to Beckman Instruments, Inc., a corporation of California
Filed Aug. 23, 1965, Ser. No. 481,679
11 Claims. (Cl. 204—301)

The present invention relates generally to electrophoresis apparatus in which an electric potential gradient is applied across a space containing an electrolyte wherein a sample is electrophoretically separated into its components.

Electrophoresis, in general, is the phenomenon of migration of charged particles or ions in a liquid carrier medium under the influence of an electric field. This phenomenon can be used to separate small particles which, by reason of different surface chemical properties, exhibit different concentrations of surface charge in the given medium. As a result of these distinctive surface properties, the mobilities of various classes of charged particles in the carrier medium will be different under the influence of the electric field.

One method of accomplishing electrophoretic separation, although the present invention is not limited thereto, is termed continuous free-flowing electrophoresis in which a buffer solution or electrolyte is made to flow freely in a uniform film or sheet within the confines of a working space. An electrical potential gradient is applied to the flowing sheet in the working space at some angle to the flow, typically being perpendicular thereto. A sample, continuously introduced at some point into the sheet of electrolyte, flows in a narrow band in the absence of the potential gradient. When the potential gradient is applied to the sheet of electrolyte, the sample particles are separated under the influence of the electric field into various particle groups or components depending upon the electrophoretic mobility of the respective particles, the strength of the field and the length of time the particles remain in the field. Particles of different mobility are concentrated in distinctive zones or bands which fan out from the point of sample application.

The potential gradient may be applied to the electrolyte in the working space by various well-known means. One approach is described in the copending application of A. Strickler, Serial No. 465,020, filed June 18, 1965, entitled "Continuous Flow Electrophoresis Apparatus," and assigned to Beckman Instruments, Inc. Another approach is the utilization of electrolyte or buffer solution, contained in an electrode space on each side of the working space and maintained in ionically-conductive contact with the electrolyte in the working space. Wire electrodes immersed in the buffer solution in the electrode spaces couple the electrolyte in the working space to a source of D.C. electrical power. The electrode space and the working space are separated by a membrane or barrier which is ion-permeable but which does not permit significant bulk flow of electrolyte or buffer solution between the spaces.

A problem which arises with the last-described apparatus is the eventual intrusion of ions, such as H+ and OH−, generated respectively at the positive and negative electrodes, into the electrolyte flowing in the working space. The presence of these ions in the working space alters the conductivity of the electrolyte, changing the electric field gradient and the observed band displacement. These ions also alter the pH in the working space. Thus, the lateral stability of the particle bands is not maintained with the exactitude required for quantitative study of particle band deflections, identification of bands and continuous collection of selected components.

Accordingly, it is an overall object of the present invention to provide an electrophoresis apparatus in which the particle bands are maintained in stable lateral positions over relatively long periods of time.

It is a more specific object of the present invention to provide an electrophoresis apparatus in which migration into the working space of ions generated at the electrodes is substantially eliminated.

According to one specific, exemplary form of the present invention shown and described herein, there is provided means for defining an electrophoresis working space in the form of a pair of elongated, flat plates fabricated of electrically insulating material, mounted in face-to-face relationship and separated from each other by suitably shaped spacer or gasket means sandwiched between the plates at the extremities of the working space. The gasket means are so shaped that the electrolyte, in which the electrophoretic separation takes place, moves from one end of the working space to the other in a uniform sheet, subject to smooth laminar flow.

Adjoining the lateral edges of the working space are means for applying an electric potential gradient across the electrolyte flowing in the working space. These means generally comprise an ion-permeable barrier disposed along each lateral edge of the working space and in contact with the working electrolyte, an electrolytic bridge or intermediate zone adjacent the ion-permeable barrier and an electrode space adjoining the intermediate zone distal from the ion-permeable barrier. An electrode is disposed in the electrode space for connection to a source of D.C. voltage. A suitable electrolyte or buffer solution, which may be the same as that flowing in the working space, is made to flow in the intermediate zone and in the electrode space. A continuous, electrically-conductive path from the electrode, through the buffer solution in the electrode space and in the intermediate zone, and through the ion-permeable barrier to the electrolyte in the working space, is thereby provided. The intermediate zone functions as an electrode isolation means, that is, it substantially precludes ions generated at the electrode from reaching the working space thereby preventing instability of the electrophoretic band pattern as a result of ionic intrusion.

The novel features which are believed to be characteristic of the invention are set forth with particularity in the appended claims. The invention itself, however, can best be understood by reference to the following description taken in conjunction with the accompanying drawings in which:

Figure 1:
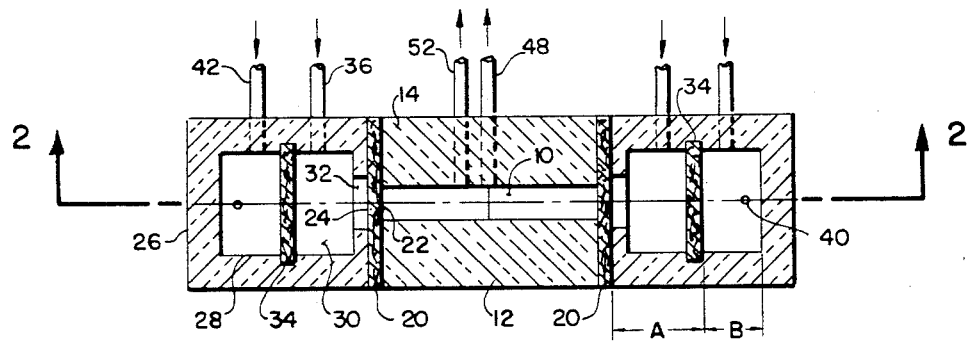
FIG. 1 is a top sectional view of an apparatus illustrative of the present invention.
Figure 2:
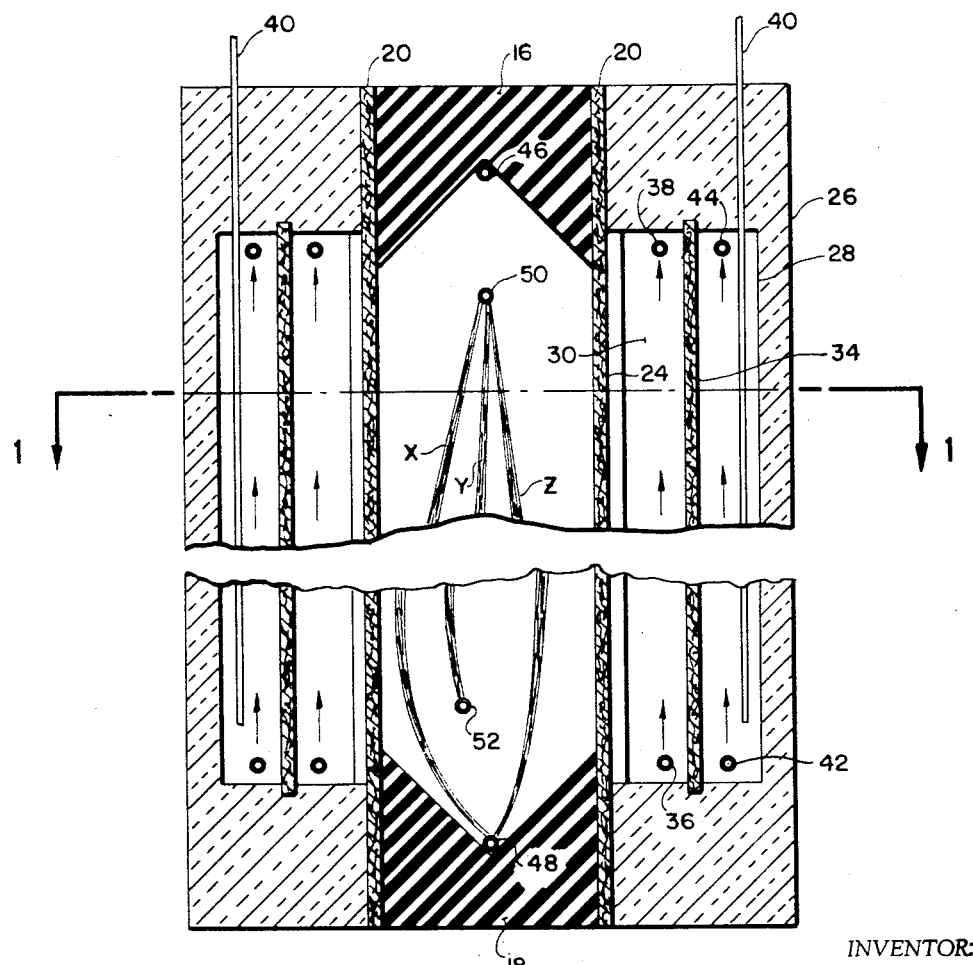
FIG. 2 is a front sectional view of the apparatus of FIG. 1.

Referring now to FIGS. 1 and 2, there is shown an apparatus for conducting electrophoretic separation of samples which may consist of pluralities of particle components or dissolved substances. Means are provided for defining an electrophoresis working space 10 including a pair of substantially flat, elongated plates 12 and 14 held in substantially parallel, face-to-face relationship and a pair of thin rubber gaskets 16 and 18 disposed between the plates at their ends. The plates 12 and 14 may be made of glass or of a transparent, acrylic plastic such as Lucite or a similar electrically-insulating substance. Adjoining each lateral edge of the working space 10 is an ion-permeable barrier 20 having an inner surface 22 in contact with the electrolyte flowing in the working space 10 and an outer surface 24. As shown, the ion-permeable barrier 20 may be made to extend the entire length and thickness of the assembly comprising the plates 12 and 14 and the gaskets 16 and 18. The barrier 20 may be fabricated of a material such as dialysis membrane, for example, regenerated cellulose or the like which does not significantly impede ionic flow while being only very slowly permeable to bulk flow of liquids. Alternatively, ion exchange membranes may be used, the barrier at the anode being selected for impermeability to cations, while the barrier at the cathode is anion-impermeable.

Positioned immediately adjacent the outer surface 24 of the ion-permeable barrier 20 is a means, which may be in the form of a housing 26, defining an elongated chamber 28 in communication with the outer barrier surface 24. The housing 26 may be made of any suitable electrically-insulating material such as glass or Lucite. The chamber 28 is divided into two major portions: a bridge or intermediate zone designated by the letter A in FIG. 1 and an electrode space B. The intermediate zone A in the embodiment of FIGS. 1 and 2 comprises a main section 30, a narrower channel 32 interconnecting the main section 30 with the outer surface 24 of the ion-permeable barrier 20 and another ion-permeable barrier 34 sealingly disposed across, the running the full length of, the chamber 30.

Means for flowing buffer solution is provided in the intermediate zone A which includes a buffer solution inlet tube 36 mounted in the housing 26. The tube 36 is positioned for communication with the lower portion of the main section 30. The buffer solution is discharged from the intermediate zone via an outlet tube 38 suitably mounted in the housing 26 proximate the upper extremity of the intermediate zone A. Although the functions of the tubes 36 and 38 may be reversed, it has been convenient to flow the buffer solution in upward direction, this serving also to flush from the intermediate zone any gas bubbles which might form during operation of the apparatus. Generally, it will be desirable in this embodiment to flow a buffer through zone A having the same composition as that used in the working space 10.

A wire electrode 40, of platinum or the like, supported by the housing 26, is disposed in each electrode space B. Connected to the electrode 40 is a source of D.C. potential (not shown).

Means for flowing buffer solution in the electrode space B is provided which includes a buffer solution inlet tube 42 in communication with the lower end of the electrode space and an outlet tube 44 mounted in the housing 26 in communication with the upper extremity of the electrode space B. For reasons the same as outlined in the description of the intermediate zone, above, the buffer solution is preferably flowed in an upward direction. Generally, in this embodiment, a buffer of relatively high capacity or concentration will be used for the electrode space B, to minimize pH changes caused by electrolysis.

The operation of the apparatus depicted in FIGS. 1 and 2 is as follows: Electrolyte introduced via a tube 46 near one of the extremities of the working space 10, is made to flow as a uniform, laminar flow sheet to the other extremity of the working space 10 where it is vented via a tube 48. The sample to be separated into its components is continuously injected into the flowing electrolyte sheet at some point in the interspace via a small tube 50 supported by the plate 14. In the absence of an electric potential gradient applied across the flowing electrolyte sheet, the sample flows along with the electrolyte in a narrow band which is vented via the discharge tube 48. When a potential gradient is applied to the sheet of electrolyte in the working space 10 by connecting a source of D.C. power to electrodes 40, the sample particles are separated under the influence of the electrical field into various particle groups or components depending upon the electrophoretic mobility of the respective particles, the strength of the field and the length of time the particles remain in the field. Each particle component forms a distinctive zone or band. The bands X, Y and Z shown in FIG. 2 are examples of bands which typically fan out from the point of sample injection. A selected band or plurality of bands of particles in the electrophoretic pattern may be removed by any suitable means such as tubes in communication with the working space 10 at points downstream of the sample injection point. One such tube 52 is shown for exemplary purposes. The electrophoretic pattern illustrated in FIG. 2 is such that the band Y is removed via the tube 52 to the exclusion of all other particle bands. During operation of the apparatus, streams of buffer solution are made to flow continuously in the intermediate zone A and the electrode space B. A continuous rinsing of flushing of the intermediate zone, the electrode space and the electrodes 40 is thereby effected and any ions generated at the electrodes are carried away by the flowing solution thereby preventing any substantial build-up of their concentration in the intermediate zone A and their migration into the working space 10.

Figure 3:
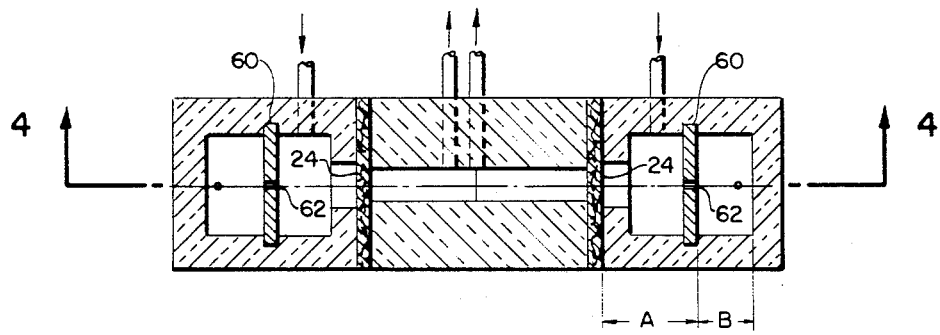
FIG. 3 is a top sectional view of an apparatus illustrative of an alternative embodiment of the present invention.
Figure 4:
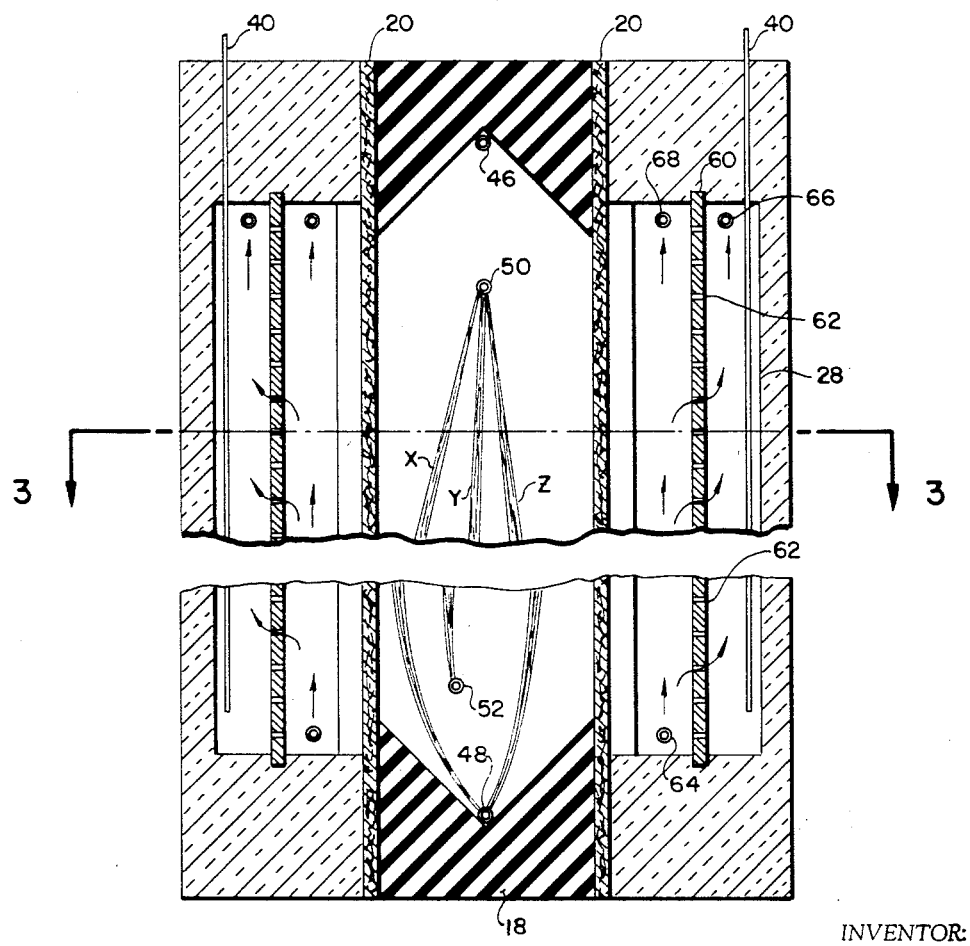
FIG. 4 is a front sectional view of the apparatus of FIG. 3.

Turning now to FIGS. 3 and 4, there is shown an apparatus exemplary of an alternative embodiment of the present invention. Generally, the apparatus is the same as that described above in connection with FIGS. 1 and 2. Instead of an ion-permeable barrier, however, a buffer solution flow-directing means is sealingly mounted in the intermediate zone A. The flow-directing means may be in the form of a grid or a series of vanes or the like which imparts a lateral component to the buffer solution flow. In the embodiment depicted in FIGS. 3 and 4, a perforated partition 60, provided with a plurality of fine holes 62, is utilized. The intermediate zone, near the bottom, is provided with a buffer solution inlet tube 64 and the electrode space B is provided with a buffer solution outlet tube 66 near the top of the electrode space. Buffer solution introduced via the tube 64 is forced to flow, as indicated by the arrows, from the intermediate zone A through the holes 62 into the electrode space B from which it is vented by way of the outlet tube 66. The holes 62 are small enough so that a buffer solution flow velocity is generated which is sufficient to oppose and substantially prevent ions generated at the electrode from migrating into the intermediate zone A, either by diffusion, or under influence of the electric field. On the other hand, the holes 66 must be large enough, and therefore of sufficiently low electrical resistance, so that electric heating of the buffer solution flowing through the holes 62 is kept to a minimum.

In order to minimize concentration polarization effect which may be associated with the membrane 24 itself, due, for example, to ion-selective or electroosmotic phenomena, and which may cause concentration or depletion of ions on the outer surface 24 of the ion-permeable barrier 20 in communication with the buffer solution in the intermediate zone A, an auxiliary buffer solution outlet tube 68 is provided. This is in communication with the upper portion of the intermediate zone. Thus, the flow of buffer solution entering the intermediate zone A by way of the inlet tube 64 divides into two parts—a first part of the flow moves upwardly in the intermediate zone and exits at the outlet tube 68; a second part of the flow, originating also at the inlet tube 64, passes through the small perforations 62 in the partition 60 and exits via the outlet tube 66.

An advantage of the embodiment of FIGS. 3 and 4 is that, other conditions permitting, a single electrolyte composition may conveniently be used throughout the apparatus, i.e. for the working space 10, the intermediate zone A and the electrode space B.

Figure 5:
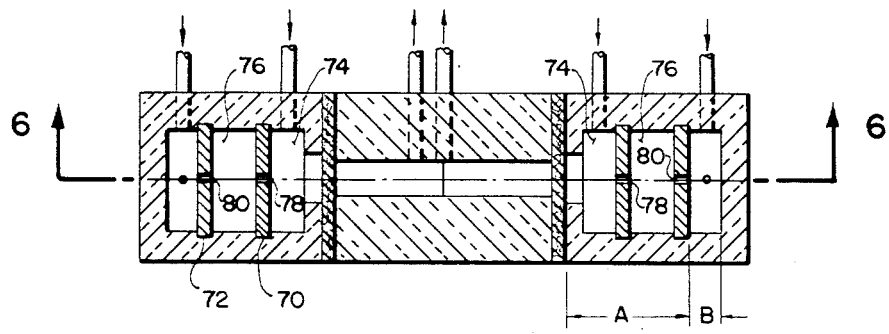
FIG. 5 is a top sectional view of an apparatus illustrative of another alternative embodiment of the present invention.
Figure 6:
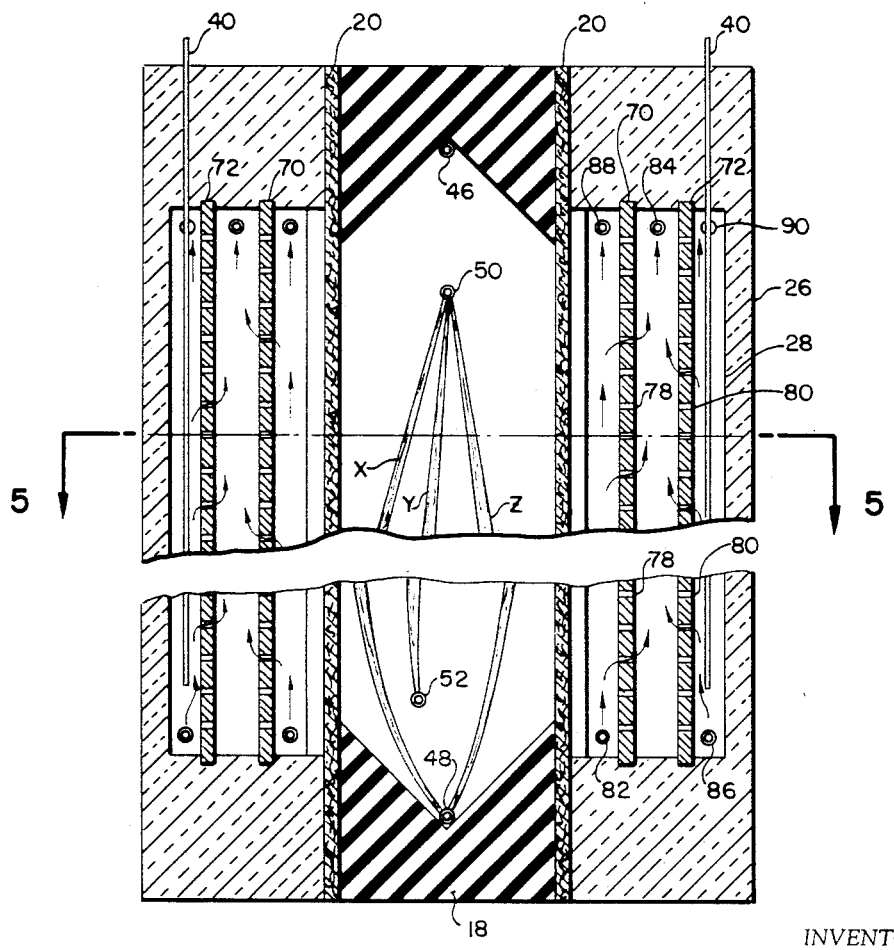
FIG. 6 is a front sectional view of the apparatus of FIG. 5.

FIGS. 5 and 6 depict another embodiment which is illustrative of the present invention. In this embodiment, two flow directing means similar to those utilized in the embodiment described immediately above and which may be in the form of perforated partitions 70 and 72, are disposed in the intermediate zone A so as to divide the zone into an inner channel 74, adjacent the ion-permeable barrier 20, and a center channel 76 between the inner channel 74 and the electrode space B. The partitions 70 and 72 are provided with a series of small holes 78 and 80, respectively, distributed substantially along the entire length of the partitions inside the intermediate zone. Means for flowing buffer solution in the intermediate zone A include an inlet 82 supported by the housing 26 near the lower end of the inner channel 74 and an outlet tube 84 located near the upper end of the center channel 76. Means for flowing buffer solution in the electrode space B include a buffer solution inlet tube 86 near the bottom of the electrode space. Buffer solution entering the chamber 28 at the inlets 82 and 86 flows at least in part through the perforated partitions 70 and 72, as indicated by the arrows, into the common center channel 76 from which it is discharged via the outlet tube 84. The holes 78 and 80 are of such a size that the magnitude of flow velocity through the holes will be sufficient to substantially prevent ionic migration from the center channel 76 to either the inner channel 74 and electrode space B. Thus, electrolysis products originating at the electrode 40 in space B cannot reach inner channel 74, ultimately contaminating the electrophoresis space 10. Nor can buffer material flowing through channel 74 reach the electrode space B.

A remaining portion of the flow entering tube 82 may be vented through an auxiliary outlet tube 88 at the top of channel 74 to minimize membrane polarization effects as described earlier. Similarly, a remaining portion of flow entering via tube 86 may be vented above through an auxiliary outlet tube 90. For conservation of these rinsing media, the overflow through the tubes 88 and 90 may be separately recirculated by suitable pumping means (not shown), to return the flow to the respective inlets 82 and 86. The common outflow from the channel 76 via the tube 84 would ordinarily be discarded. In practice, the proportion of flow diverted from space 74 and space B into the center channel 76 would be a small portion of the total flow, so that the rate of discard or loss of electrolyte is held to a minimum. Ordinarily, it will be possible and advantageous to mix the outflows from space B via the tubes 90 on the anode and cathode sides in the course of recirculating. This will restore neutrality to the solution by mutual neutralization of the H+ and OH− ions which are electrolytically generated anode and cathode respectively. Suitable electrolytes for circulation through the electrode spaces B include phosphate salts or buffer, and sodium sulfate.

An advantage of this arrangement is that a completely independent choice can be made of the electrolyte desired for flushing the electrode space B and for the inner channel 74. The usefulness of this capability may be explained as follows. Preferably, to maintain an unvarying chemical condition in the working space 10, the electrolyte in the inner channel 74 should have the same composition as in space 10. Sometimes, however, this desired composition, selected for compatibility with the sample particles, may not be fully compatible with exposure to the electrodes in space B. For example, it might foul the electrodes, or be progressively altered electrochemically in a manner preventing restoration by simple mixing and neutralization.

Figure 7:
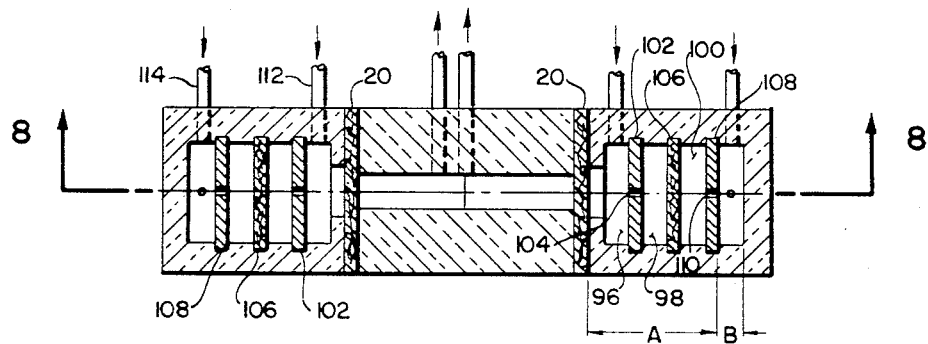
FIG. 7 is a top sectional view of an apparatus illustrative of yet another alternative embodiment of the present invention; and, FIG. 8 is a front sectional view of the apparatus of FIG. 7.
Figure 8:
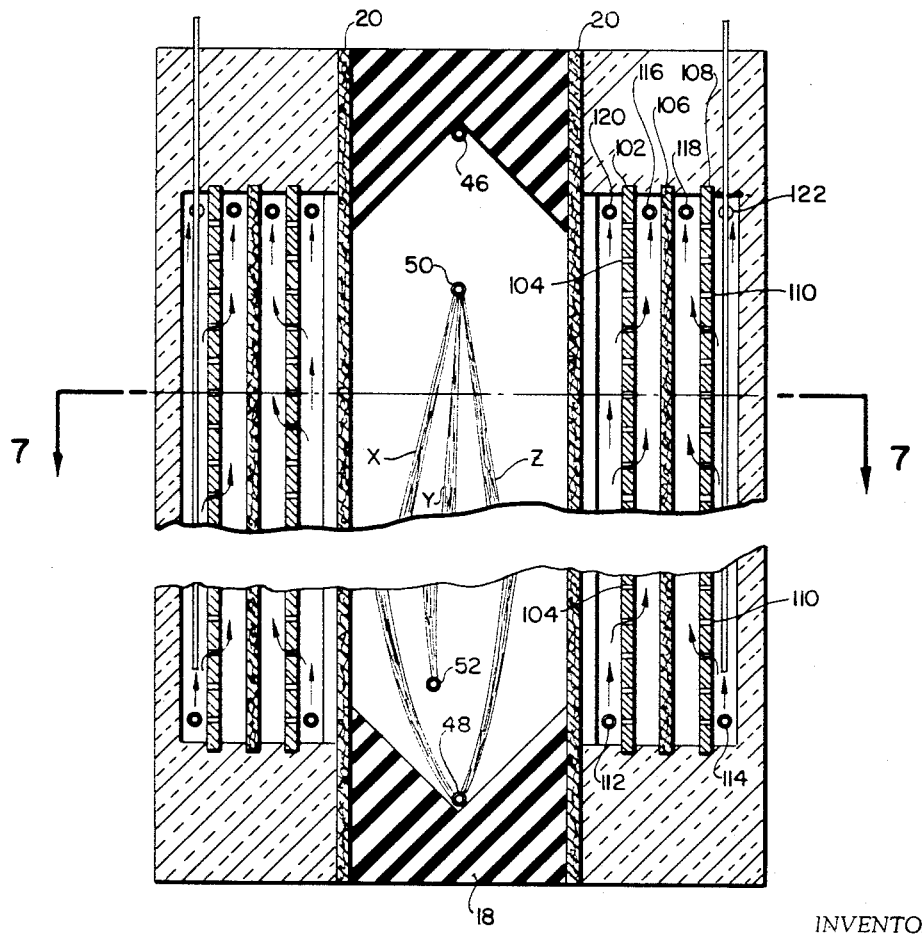

Turning now to FIGS. 7 and 8, there is shown yet another alternative embodiment which is exemplary of the present invention. The intermediate zone A in this embodiment is divided into three parts: an inner channel 96, an inner-center channel 98 and an outer-center channel 100. The inner channel 96 is defined by the ion-permeable barrier 20 and a flow-directing means as described above, and which may be in the form of a perforated partition 102 provided with small holes 104. The inner-center channel 98 is bordered by the perforated partition 102 on the inside and an ion-permeable barrier 106, similar to the barrier 20, on the outside. The outer-center channel 100 is defined by the ion-permeable barrier 106 and a second flow-directing means, similar to those already described, and which may be in the form of another perforated partition 108 adjoining the electrode space B. Holes 110 are provided in the partition 108 to bring the outer-center channel 100 into communication with the electrode space B. Buffer solution inlet tubes 112 and 114 are mounted in the housing 26 in communication with the lower portions of the inner channel 96 and the electrode space B, respectively. Outlet tubes 116 and 118 are provided to vent the buffer solution from the upper portions of the inner-center channel 98 and the outer-center channel 100, respectively. The velocity of the buffer solution flowing through the perforated partition 102, in the direction indicated by the arrows, opposes and substantially prevents the inward migration of any ions which may be present in the inner-center channel 98. In a similar fashion, the buffer solution entering via the inlet tube 114 flows through the partition 108 and exits via the outlet tube 118 in the outer-center channel 100. Any ions in the outer-center channel 100 are thereby substantially prevented from traversing into the electrode space B. The presence of the ion-permeable barrier 106 minimizes the possibility of back-flow of unwanted ions through the holes 104 and 110. As in the embodiments previously described, auxiliary buffer solution outlet tubes 120 and 122 may be utilized to flow a portion of the buffer solution from the upper portions of the inner channel 96 and the electrode space B, respectively. This helps eliminate concentration polarization effects, and permits the buffer solutions flowing in the inner channel 96 and in the electrode space B to be separately recirculated and conserved. The buffer solution discharging from the center channels 98 and 100 may be discarded.

It will be obvious to those skilled in the art that various modifications may be made to the specific exemplary embodiment of the invention described. While a particular embodiment has been discussed, it will be understood that the invention is not limited thereto and that it is contemplated to cover any such modifications as fall within the true spirit and scope of the invention by the appended claims.

What is claimed is:

1. In an apparatus for electrophoretically separating a sample into its components comprising means defining a working space for holding an electrolyte in which said electrophoretic separation of said sample takes place and including means adjoining each side of said working space whereby a potential gradient may be applied across said electrolyte in said working space, the latter means comprising an ion-permeable barrier having an inner and an outer surface, said inner surface of said barrier being in contact with said electrolyte in said working space;

means defining a chamber, said chamber being divided into an intermediate zone in communication with said outer surface of said ion-permeable barrier and an electrode space distal from said outer surface of said ion-permeable barrier;

an electrode disposed in said electrode space;

means for flowing buffer solution in said electrode space in contact with said electrode;

means for flowing buffer solution in said intermediate zone in contact with said outer surface of said ion-permeable barrier, said intermediate zone substantially preventing bulk flow of said buffer solution from said electrode space to said working space and further substantially preventing transfer of ions generated at said electrode to said working space, yet affording a continuous electrically-conductive path between said electrode and said electrolyte in said working space; and a source of electrical power connected to said electrode.

2. An apparatus as defined in claim 1 which includes another ion-permeable barrier mounted in said chamber, said other barrier dividing said chamber into said intermediate zone and said electrode space; and in which said means for flowing buffer solution in said intermediate zone includes a buffer solution inlet and an outlet in said intermediate zone; and said means for flowing buffer solution in said electrode space includes a buffer solution inlet and an outlet in said electrode space.

3. An apparatus as defined in claim 1 which includes flow-directing means in said intermediate zone for directing flow of said buffer solution toward said electrode space at a velocity sufficient to substantially prevent migration of ions toward said working space.

4. An apparatus as defined in claim 3 in which said flow-directing means comprises a perforated partition mounted in said chamber, said partition dividing said chamber into said intermediate zone and said electrode space;

said means for flowing buffer solution in said intermediate zone includes an inlet in said zone; and said means for flowing buffer solution in said electrode space includes an outlet in said space.

5. An apparatus as defined in claim 4 which includes an auxiliary buffer solution outlet in said intermediate zone.

6. An apparatus as defined in claim 3 which includes other flow-directing means in said intermediate zone for directing flow of said buffer solution away from said electrode space at a velocity sufficient to prevent migration of ions into said electrode space.

7. An apparatus as defined in claim 6 in which said one and said other flow-directing means comprise perforated partitions mounted in said chamber substantially parallel to said ion-permeable barrier.

8. An apparatus as defined in claim 6 in which said one and said other flow-directing means define an inner channel adjoining said ion-permeable barrier, a center channel between said one and said other flow-directing means and said electrode space adjoining said second flow-directing means on the side opposite said center channel;

said means for flowing buffer solution in said intermediate zone includes a buffer solution inlet in said inner channel and a buffer solution outlet in said center channel; and said means for flowing buffer solution in said electrode space includes a buffer solution inlet in said space.

9. An apparatus as defined in claim 8 which includes an auxiliary buffer solution outlet in said inner channel; and an auxiliary buffer solution outlet in said electrode space.

10. An apparatus as defined in claim 6 which includes another ion-permeable barrier mounted in said intermediate zone between said first and second flow-directing means thereby defining an inner channel adjoining said one ion-permeable barrier, an inner-center channel between said first flow-directing means and said other ion-permeable barrier and an outer-center channel between said other ion-permeable barrier and said second flow-directing means; and in which said means for flowing buffer solution in said intermediate zone includes a buffer solution inlet in said inner channel, an outlet in said inner-center channel and an outlet in said outer-center channel;

said means for flowing buffer solution in said electrode space includes a buffer solution inlet in said electrode space.

11. An apparatus as defined in claim 10 in which an auxiliary buffer solution outlet in said inner channel; and an auxiliary buffer solution outlet in said electrode space.

References Cited

UNITED STATES PATENTS

| 2,555,487 | 6/1951 | Haugaard et al. | 204—180 |
| 2,879,217 | 3/1959 | Durrum et al. | 204—299 |

HOWARD S. WILLIAMS, *Primary Examiner.*

A. C. PRESCOTT, *Assistant Examiner.*